United States Patent
Kuo et al.

(10) Patent No.: US 12,289,524 B2
(45) Date of Patent: Apr. 29, 2025

(54) DRIVING MECHANISM FOR MOVING IMAGE SENSOR

(71) Applicant: TDK TAIWAN CORP., Taoyuan (TW)

(72) Inventors: Chen-Chi Kuo, Taoyuan (TW); Yi-Ho Chen, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/487,992

(22) Filed: Sep. 28, 2021

(65) Prior Publication Data

US 2022/0021812 A1 Jan. 20, 2022

Related U.S. Application Data

(63) Continuation of application No. 17/128,567, filed on Dec. 21, 2020, now Pat. No. 11,159,729, which is a (Continued)

(30) Foreign Application Priority Data

Jun. 6, 2019 (CN) .......................... 201910492357.9

(51) Int. Cl.
*H04N 5/232* (2006.01)
*G03B 5/02* (2021.01)
(Continued)

(52) U.S. Cl.
CPC ............. *H04N 23/687* (2023.01); *G03B 5/02* (2013.01); *H04N 23/54* (2023.01); *H04N 23/55* (2023.01); *G03B 2205/0015* (2013.01)

(58) Field of Classification Search
CPC ............. H04N 5/23287; H04N 5/2253; H04N 5/2254; H04N 5/2257; H04N 23/687;
(Continued)

(56) References Cited

U.S. PATENT DOCUMENTS 9,720,204 B2    8/2017  Yoo et al.
2005/0046736 A1* 3/2005 Kuchimaru ............ H04N 23/55
                                                         348/340

(Continued)

*Primary Examiner* — Usman A Khan
(74) *Attorney, Agent, or Firm* — Muncy, Geissler, Olds & Lowe, P.C.

(57) ABSTRACT

An image sensor driving mechanism includes a fixed assembly, a movable assembly, and a driving assembly. The movable assembly includes a circuit component. The circuit component includes a circuit main body and a movable suspension arm. The circuit main body is configured to hold an image sensor. The movable suspension arm is elastically connected to the circuit main body and the fixed assembly. The image sensor is electrically connected to the fixed assembly via the circuit component. The image sensor extends in a direction that is perpendicular to the optical axis. The drive assembly is configured to drive the movable assembly to move relative to the fixed assembly. The movable suspension arm includes a section that extends in a different direction than the optical axis.

19 Claims, 9 Drawing Sheets

Related U.S. Application Data continuation of application No. 16/521,879, filed on Jul. 25, 2019, now Pat. No. 10,904,440.

(60) Provisional application No. 62/703,147, filed on Jul. 25, 2018.

(51) Int. Cl.
*H04N 5/225* (2006.01)
*H04N 23/54* (2023.01)
*H04N 23/55* (2023.01)
*H04N 23/68* (2023.01)

(58) Field of Classification Search
CPC ........ H04N 23/54; H04N 23/55; H04N 23/57; G03B 5/02; G03B 2205/0015; G03B 2205/0046; G03B 2205/0053; G03B 2205/0069; G03B 3/10; G03B 5/00
USPC .................................................. 348/208.11
See application file for complete search history.

(56) References Cited

U.S. PATENT DOCUMENTS

| | | | |
|---|---|---|---|
| 2006/0018646 A1* | 1/2006 | Stavely .................. | G03B 17/02 348/E5.046 |
| 2006/0072019 A1* | 4/2006 | Stavely .................. | H04N 23/60 348/208.99 |
| 2006/0251410 A1* | 11/2006 | Trutna, Jr. ......... | H04N 23/6811 348/E5.046 |
| 2006/0272328 A1* | 12/2006 | Hara ....................... | G03B 5/00 60/527 |
| 2007/0297780 A1* | 12/2007 | Enomoto ............... | H04N 23/68 348/E5.025 |
| 2009/0010638 A1* | 1/2009 | Chao ....................... | G02B 7/02 396/529 |
| 2020/0099831 A1 | 3/2020 | Chang et al. | |

\* cited by examiner

DRIVING MECHANISM FOR MOVING IMAGE SENSOR

CROSS REFERENCE TO RELATED APPLICATIONS

This application is a Continuation of application Ser. No. 17/128,567, filed Dec. 21, 2020, which is a Continuation of application Ser. No. 16/521,879, filed Jul. 25, 2019, which claims the benefit of U.S. Provisional Application No. 62/703,147, filed Jul. 25, 2018, and China Patent Application No. 201910492357.9, filed Jun. 6, 2019, the entirety of which are incorporated by reference herein.

BACKGROUND OF THE INVENTION

Field of the Invention

The application relates in general to a driving mechanism, and in particular, to an image sensor driving mechanism.

Description of the Related Art

With technology has progressed, camera modules have come to be widely applied in portable electronic devices such as cell phones and tablet computers. In general, a camera module has a lens and an image sensor. Incident light can fall on the image sensor via the lens, and the image sensor generates an image signal according the incident light. For the camera module to achieve high image quality, the camera module utilizes a drive motor to adjust the position of the lens, thus facilitating auto-focus and auto-zoom control of the camera module.

Moreover, in most cases, when a user takes photographs using the portable electronic apparatus, it is mostly held by hand. In general, the image captured by the portable electronic apparatus can be blurry when there is insufficient light. In order to prevent the above deficiency, optical image stabilization is added to the camera module of the prior art.

However, although conventional camera modules have generally been adequate for their intended purposes, they have not been entirely satisfactory in all respects. Consequently, it is desirable to provide a solution for improving optical image stabilization of camera modules.

BRIEF SUMMARY OF INVENTION

The image sensor driving mechanism of the present disclosure can precisely move the image sensor to provide a well optical shaking compensation, and the image sensor can obtain a high quality image.

An embodiment of the present application provides an image sensor driving mechanism, including a fixed assembly, a first movable assembly, and a first driving assembly. The fixed assembly includes a frame. The first movable assembly includes a circuit component. The circuit component includes a circuit main body and a movable suspension arm. The circuit main body is configured to hold an image sensor. The movable suspension arm is elastically connected to the circuit main body and the fixed assembly. The image sensor is electrically connected to the fixed assembly via the circuit component. The image sensor extends in a direction that is perpendicular to the optical axis. The first drive assembly is configured to drive the first movable assembly to move relative to the fixed assembly.

The movable suspension arm includes a first section, which extends in a different direction than the optical axis and is electrically connected to the image sensor. The movable suspension arm can move relative to the circuit main body and the fixed assembly. The frame has a frame surface, facing the first movable assembly and perpendicular to the optical axis. The frame surface has a through hole corresponding to the image sensor, and a gap is formed between the frame surface and the first movable assembly.

In some embodiments, the image sensor driving mechanism further includes a second movable assembly and a second driving assembly. The second movable assembly is movably disposed in the fixed assembly and configured to hold an optical member. The second driving assembly is configured to drive the second movable assembly to move relative to the fixed assembly along a first direction. The frame surface is disposed between the second movable assembly and the first movable assembly.

In some embodiments, the first movable assembly further comprises a holder, disposed on the circuit component and surrounding the image sensor. The holder has a receiving portion, configured to receive a portion of the circuit component.

In some embodiments, the movable suspension arm further comprises a connecting portion connected to the circuit main body and the first section. The extending direction of the connecting portion is different than the extending direction of the first section, wherein a portion of the connecting portion is accommodated in the receiving portion.

In some embodiments, the image sensor is disposed between the circuit component and the frame surface. The first driving assembly is disposed on the peripheral area of the first movable assembly.

In some embodiments, the width of the first section is greater than the thickness of the first section, the width is measured along a direction parallel to the optical axis, and the thickness is measured along a direction that is perpendicular to the optical axis.

In some embodiments, the circuit component has a circuit component surface, continuously arranged on the circuit main body and the first section. The circuit component surface on the circuit main body faces the image sensor, and the circuit component surface on the first section is parallel to the optical axis.

In some embodiments, the circuit component further comprises a second section. The extending direction of the second section is different than the extending direction of the first section.

In some embodiments, the first section is disposed on the peripheral area of the first movable assembly, and the first section and the first movable assembly partially overlap as seen from a direction that is perpendicular to the optical axis.

In some embodiments, the image sensor driving mechanism further comprises an additional first section. The first section and the additional first section are disposed on two sides of the first movable assembly.

In some embodiments, the circuit component further comprises a plurality of second sections disposed on the two sides of the first movable assembly, and the extending directions of the second sections are different than the extending direction of the first section.

In some embodiments, the fixed assembly further comprises a case. The case has a lateral wall parallel to the optical axis. The lateral wall and the circuit component partially overlap as seen from a direction parallel to the optical axis.

In some embodiments, the image sensor driving mechanism further comprises a position detecting assembly, configured to detect the movement of the first movable assembly relative to the fixed assembly.

In some embodiments, the image sensor driving mechanism further comprises a second movable assembly and a second driving assembly. The second movable assembly is configured to hold an optical member. The second movable assembly is movably connected to the fixed assembly. The second driving assembly is configured to drive the second movable assembly to move relative to the fixed assembly. The position detecting assembly has a magnetic force sensor, disposed on the first movable assembly and corresponding to a driving magnetic member of the second driving assembly. In some embodiments, the driving magnetic member is disposed on the fixed assembly.

In summary, in the image sensor driving mechanism of the present disclosure, owing to the circuit component, the first driving assembly can precisely move the image sensor, so as to provide a well optical shaking compensation, and the image sensor can obtain a high quality image.

BRIEF DESCRIPTION OF DRAWINGS

The invention can be more fully understood by reading the subsequent detailed description and examples with references made to the accompanying drawings, wherein:

FIGS. 3A and 3B are exploded views of the image sensor driving mechanism in accordance with some embodiments of the present disclosure, wherein FIG. 3B is a continued drawing of FIG. 3A;

DETAILED DESCRIPTION OF INVENTION

Figure 1:
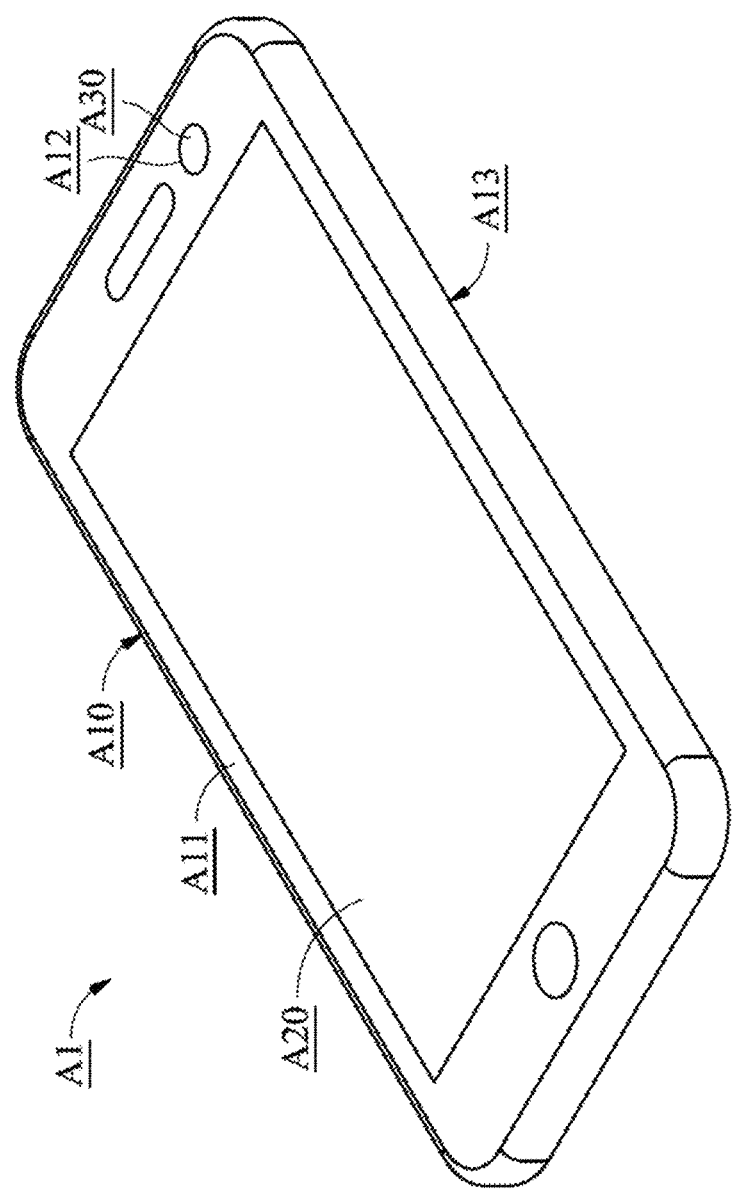
FIG. 1 is a perspective view of an electronic device in accordance with some embodiments of the present disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. Moreover, the shape, size, thickness, and angle of inclination depicted in the drawings may not be drawn to scale or may be simplified for clarity of discussion; these drawings are merely intended for illustration.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 is a perspective view of an electronic 6 in accordance with some embodiments of the present disclosure. The electronic device A1 can be a portable electronic device (such as a smartphone, a tablet computer, or a laptop computer), a wearable electronic device (such as a smart watch), or a vehicle-type electronic device (such as a driving recorder). In this embodiment, the electronic device A1 is a smartphone.

The electronic device A1 includes an outer housing A10, a display panel A20, and at least one camera module A30. The outer housing A10 can be a plate structure. The display panel A20 is disposed on a display surface A11 of the outer housing A10, and configured to display an image.

The camera module A30 is disposed in the outer housing A10, and corresponds to a light hole A12 of the outer housing A10. The camera module A30 generates image signals according to the light falling on the camera module A30 via the light hole A12. The display panel A20 displays an image according to the image signals. In some embodiments, the camera module A30 has a zoom function and an image stabilization function.

For clarity, there are one light hole A12 and one camera module A30 are illustrated in the figures of the present disclosure. In some embodiments, the electronic device A1 has a plurality of light holes A12 disposed on the rear surface A13 and/or the display surface A11 of the outer housing A10 and a plurality of camera modules A30 corresponding to the light holes A12.

Figure 2:
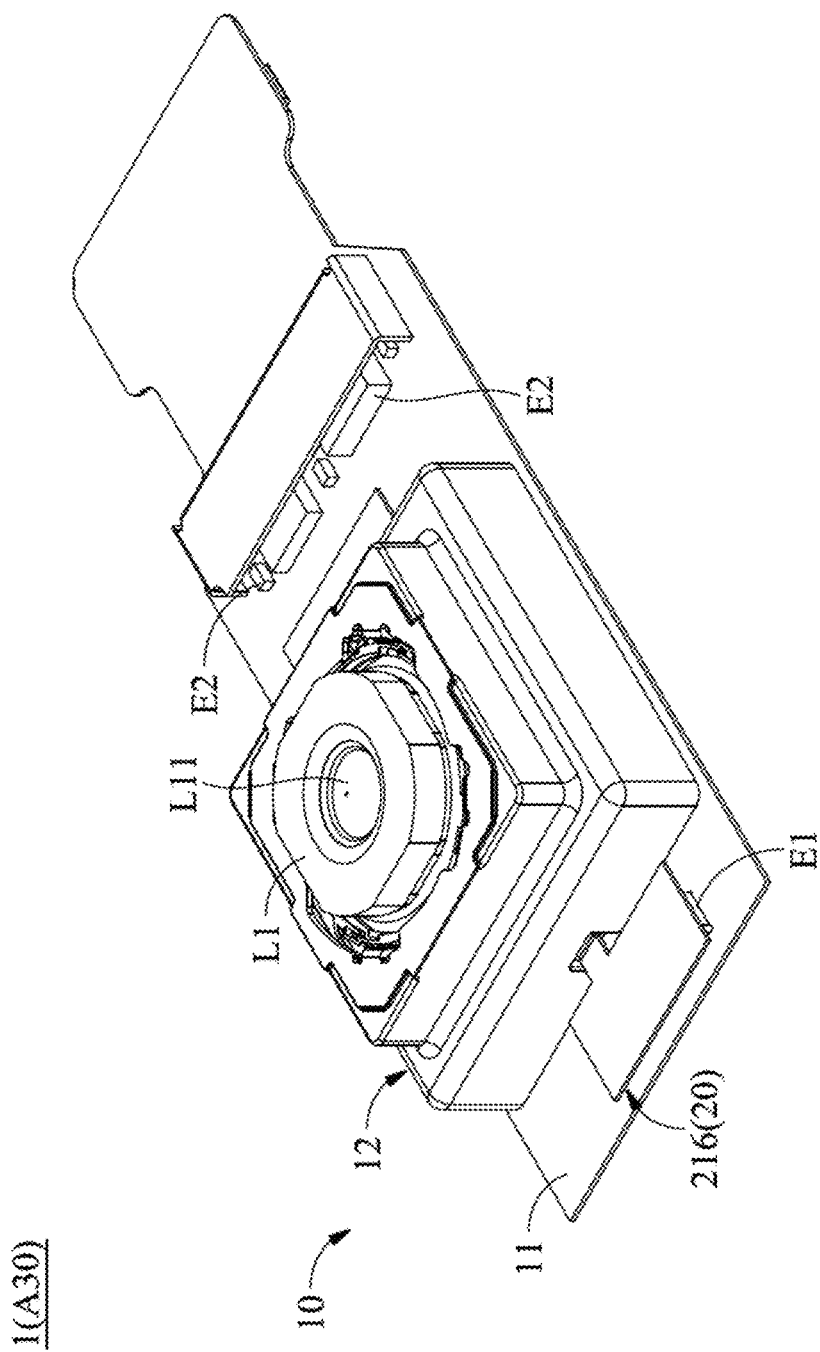
FIG. 2 is a perspective view of an image sensor driving mechanism in accordance with some embodiments of the present disclosure.
Figure 3A:
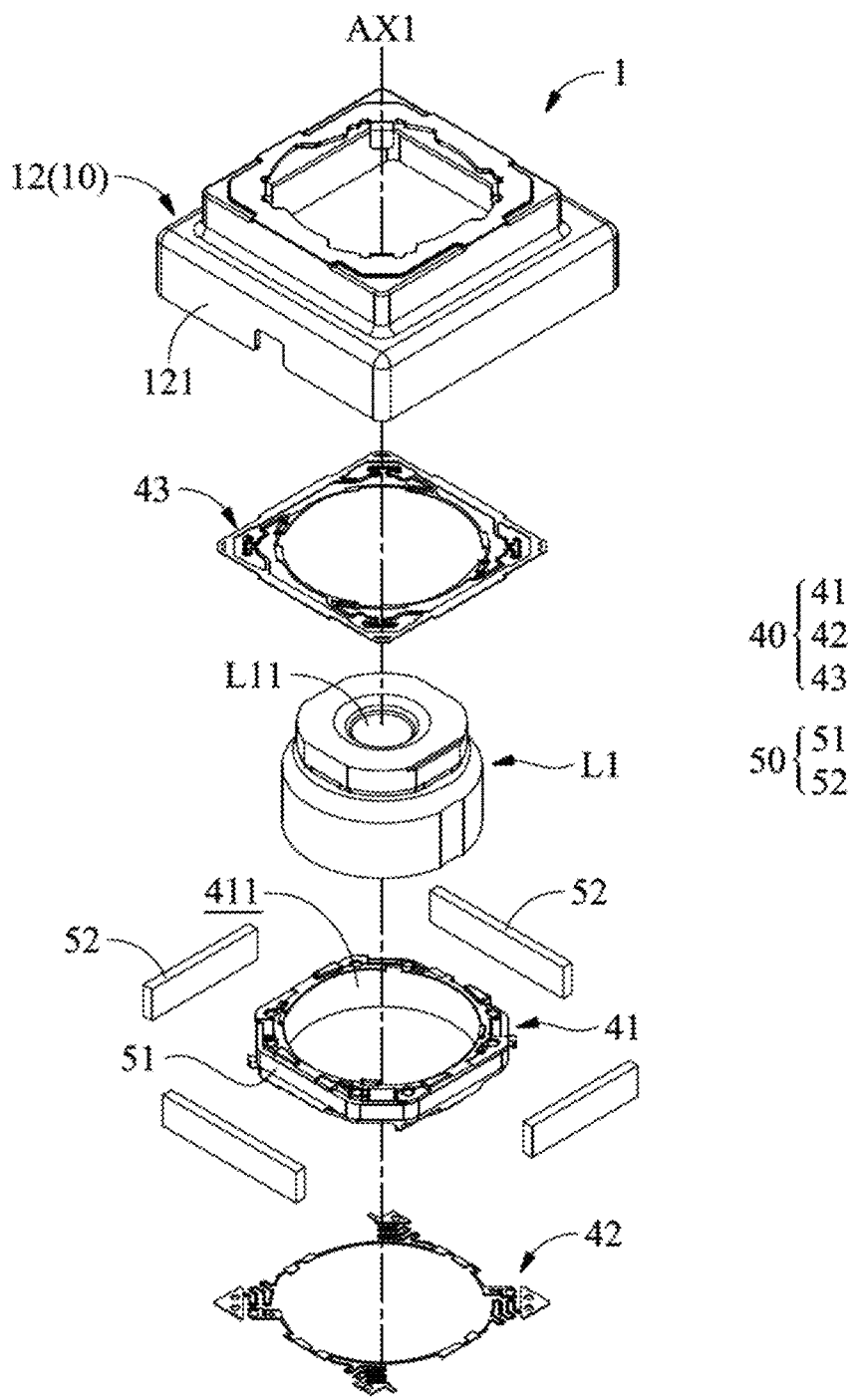
Figure 3B:
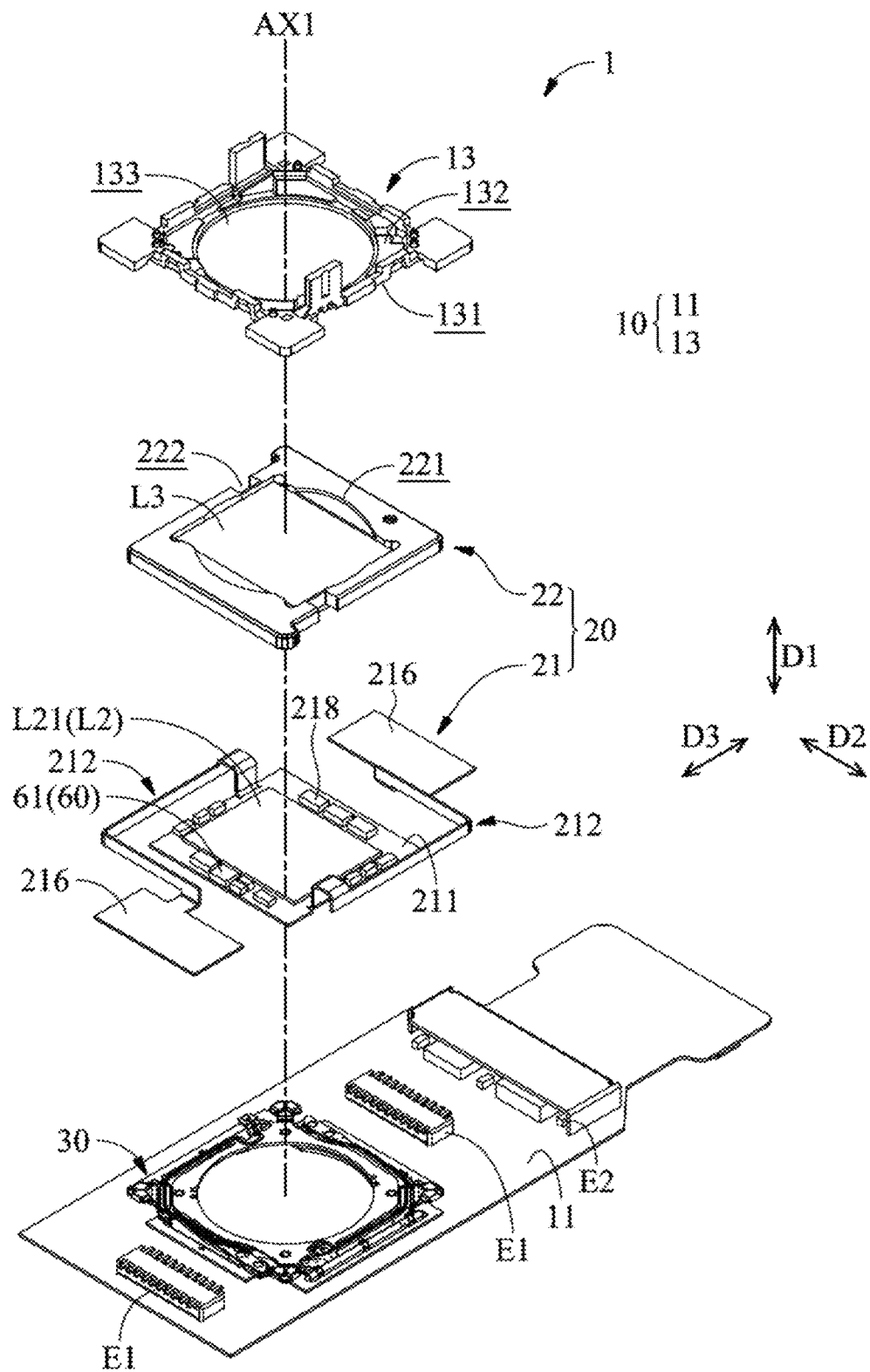
Figure 4:
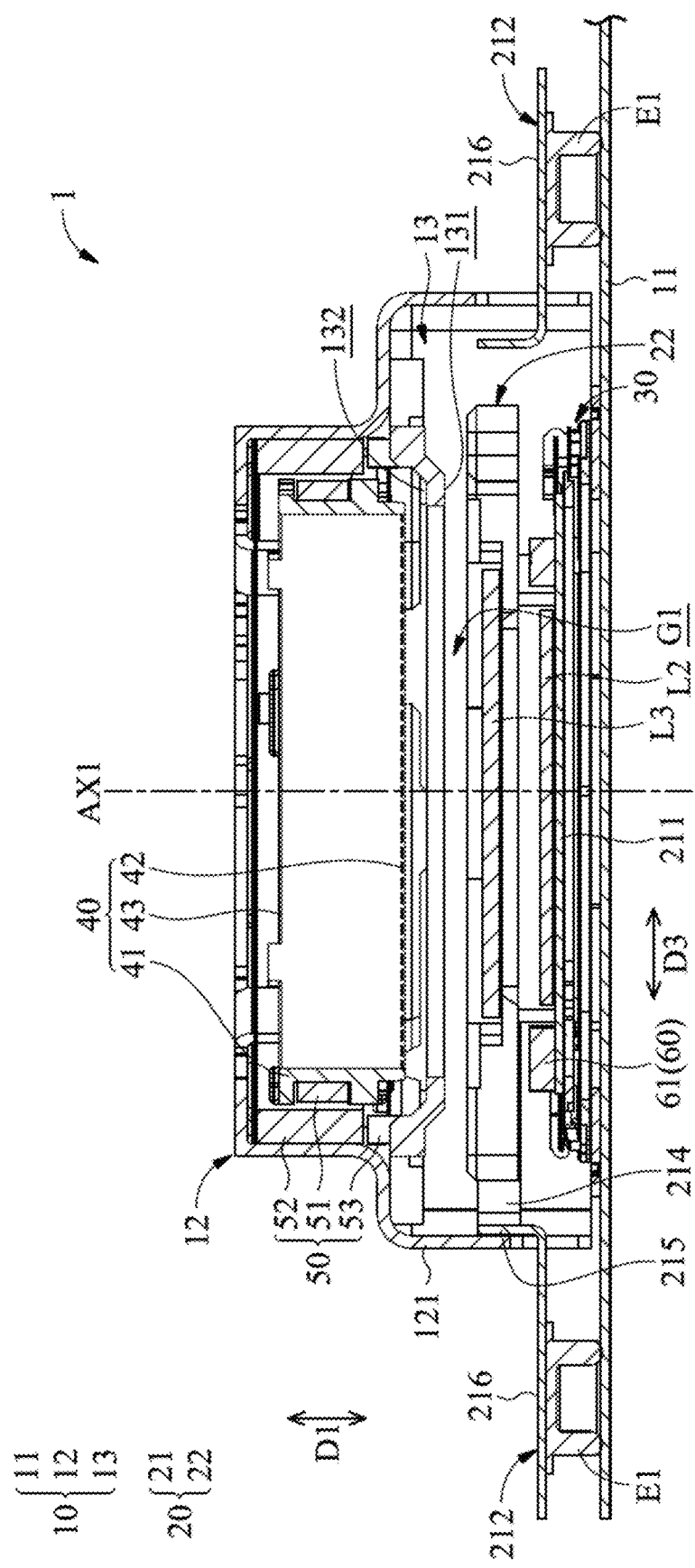
FIG. 4 is a cross-sectional view of the image sensor driving mechanism in accordance with some embodiments of the present disclosure.

FIG. 2 is a perspective view of an image sensor driving mechanism 1 in accordance with some embodiments of the present disclosure. FIGS. 3A and 3B are exploded views of the image sensor driving mechanism 1 in accordance with some embodiments of the present disclosure, wherein FIG. 3B is a continued drawing of FIG. 3A, and a lower elastic member 42 is situated above a frame 13. FIG. 4 is a cross-sectional view of the image sensor driving mechanism 1 in accordance with some embodiments of the present disclosure. For clarity, an optical member L1 is not shown in FIG. 4. The camera module A30 includes the image sensor driving mechanism 1, the optical member L1, and an image sensor L2. The image sensor driving mechanism 1 can be configured to move the optical member L1 along the optical axis AX1. Furthermore, the image sensor driving mechanism 1 can be configured to rotate or move the image sensor L2 on a plane that is perpendicular to the optical axis AX1. In some embodiments, the image sensor driving mechanism 1 can move the image sensor L2 along the optical axis AX1 or a first direction D1. The optical axis AX1 is parallel to the first direction D1.

In this embodiment, the optical member L1 includes one or more lenses L11. The optical axis AX1 passes the center of the lenses L11 of the optical member L1. The lenses L11 can extend in a direction that is perpendicular to the optical axis AX1. The image sensor L2 can be a plate structure, and can extend in a direction that is perpendicular to the optical axis AX1. When the image sensor L2 is in an initial position, the optical axis AX1 passes the center of the image sensor L2, and extends along a direction that is perpendicular to a sensing surface L21 of the image sensor L2.

In this embodiment, the incident light can pass the optical member L1 along the optical axis AX1 and fall on the image sensor L2. Since the optical member L1 of the image sensor driving mechanism 1 can move along the optical axis AX1, the incident light can focus on the image sensor L2 through the lenses L11. After receiving the incident light, the image sensor L2 can transform the incident light into an electric signal (image signal) via photoelectric conversion.

As shown in FIGS. 3A, 3B, and 4, the image sensor driving mechanism 1 includes a fixed assembly 10, a first movable assembly 20, a first driving assembly 30, a second movable assembly 40, and a second driving assembly 50. The first movable assembly 20 is elastically connected to the fixed assembly 10, and configured to hold the image sensor L2. The first driving assembly 30 is disposed on the fixed assembly 10, and configured to drive the first movable assembly 20 to move (rotate and/or shift) relative to the fixed assembly 10. In other words, the first driving assembly 30 can rotate or shift the image sensor L2 relative to the fixed assembly 10. Owing to the first movable assembly 20 and the first driving assembly 30, the optical image stabilization function can be provided to the image sensor driving mechanism 1 (camera module A30).

The second movable assembly 40 can be movably disposed in the fixed assembly 10, and configured to hold the optical member L1. The second driving assembly 50 is disposed in the fixed assembly 10, and configured to drive the second movable assembly 40 to move relative to the fixed assembly 10 along the first direction D1. In other words, the second driving assembly 50 can drive the optical member L1 to shift relative to the fixed assembly 10 along the first direction D1. Owing to the second movable assembly 40 and the second driving assembly 50, the zoom function can be provided to the image sensor driving mechanism 1 (camera module A30).

In this embodiment, the fixed assembly 10 includes a bottom plate 11, a case 12, and a frame 13. The bottom plate 11 can be a circuit board. In some embodiments, the bottom plate 11 can be a flexible printed circuit (FPC). The bottom plate 11 extends in a direction that is perpendicular to the first direction D1. A plurality of electrical connectors E1 and a plurality of electronic members E2 can be disposed on the bottom plate 11, and electrically connected to the bottom plate 11. For example, the electronic members E2 can include a chip, a resistance, and/or a capacitance, but it is not limited thereto.

The case 12 is disposed on the bottom plate 11. In some embodiments, the case 12 can be affixed to the bottom plate 11. Moreover, the case 12 can be made by metal, so as to prevent the image sensor L2 being disturbed by the electromagnetic wave.

The frame 13 can be disposed in the case 12. In some embodiments, the frame 13 can be affixed in the case 12 and situated on the bottom plate 11. The frame 13 can be made of a rigid insulation material, such as hard plastic. The frame can be an annular structure surrounding the optical axis AX1. The frame 13 can extend on a plane that is perpendicular to the optical axis AX1.

In this embodiment, the frame 13 has a first frame surface 131 (frame surface), a second frame surface 132, and a first through hole (through hole) 133. The first frame surface 131 and the second frame surface 132 extend in a direction that is perpendicular to the optical axis AX1, and disposed between the first movable assembly 20 and the second movable assembly 40. The first frame surface 131 faces the first movable assembly 20, and the second frame surface 132 faces the second driving assembly 50.

The first through hole 133 passes through the first frame surface 131 and the second frame surface 132. In other words, the first frame surface 131 and the second frame surface 132 have the first through hole 133. Furthermore, the first through hole 133 corresponds the image sensor L2, and the optical axis AX1 passes through the center of the first through hole 133.

As shown in FIG. 4, a gap G1 is formed between the first frame surface 131 and the first movable assembly 20. In some embodiments, the gap F1 can be an air layer or a vacuum layer. In other words, the first movable assembly 20 is separated from the frame 13.

In this embodiment, the gap G1 can avoid the first movable assembly 20 impacting the frame 13 during the first movable assembly 20 moves relative to the frame 13. Furthermore, owing to the gap G1, the image sensor driving mechanism 1 can include the first movable assembly 20, the first driving assembly 30, the second movable assembly 40, and/or the second driving assembly having different dimensions and design.

Figure 5:
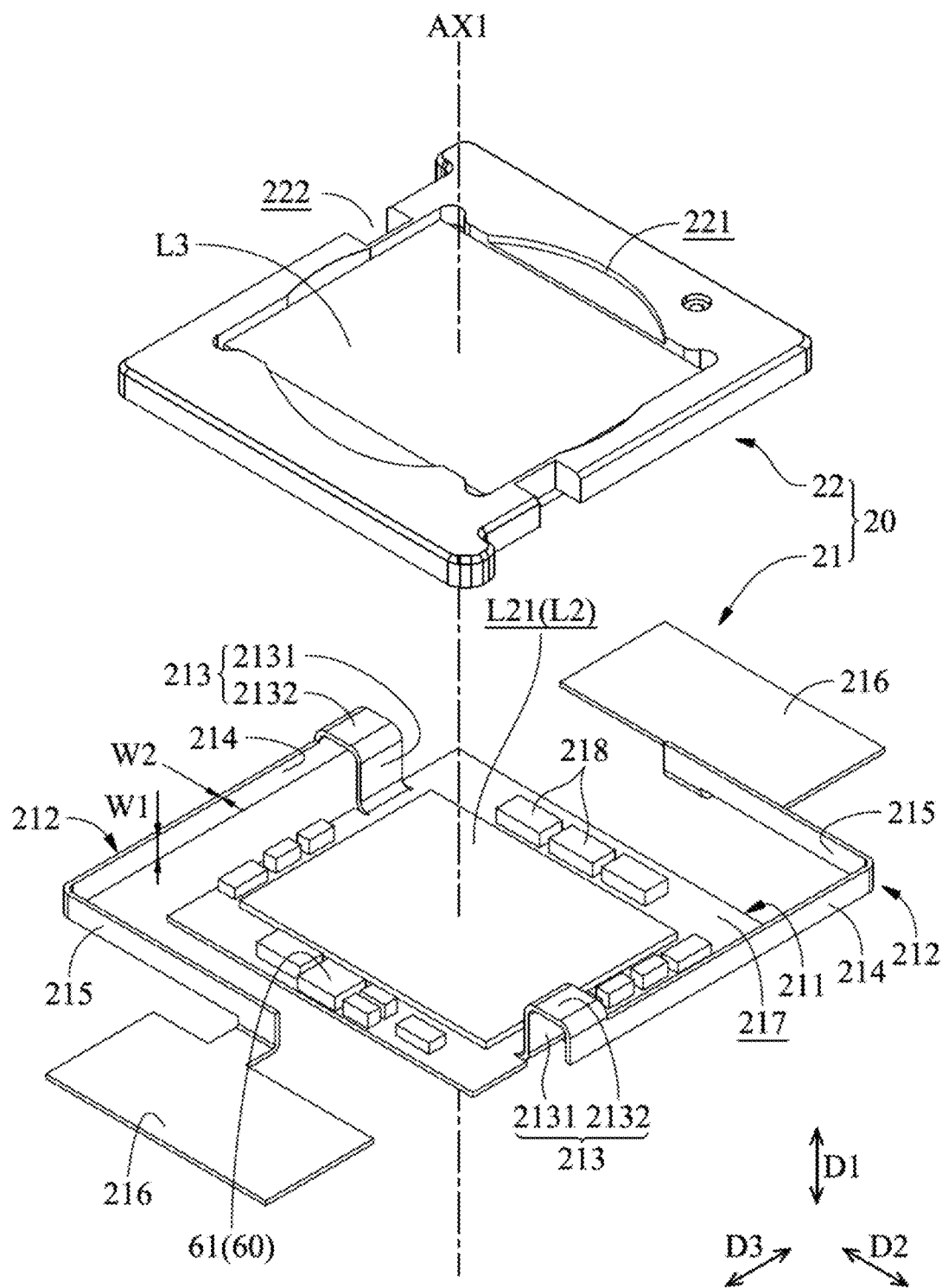
FIG. 5 is an exploded view of the first movable assembly in accordance with some embodiments of the present disclosure.

FIG. 5 is an exploded view of the first movable assembly 20 in accordance with some embodiments of the present disclosure. The first movable assembly 20 includes a circuit component 21 and a holder 22. The circuit component 21 is elastically connected to the fixed assembly 10 and configured to hold the image sensor L2. The image sensor L2 can be affixed to the circuit component 21, and electrically connected to the circuit component 21 and the bottom plate 11. In other words, the image sensor L2 is electrically connected to the bottom plate 11 of the fixed assembly 10 via the circuit component 21. In this embodiment, the circuit component 21 is a trimmed and bended flexible printed circuit.

The circuit component 21 includes a circuit main body 211 and a plurality of movable suspension arms 212. The circuit main body 21 extends in a direction that is perpendicular to the optical axis AX1. When the first movable assembly 20 is in the initial position, the optical axis passes the center of the circuit main body 211. The image sensor L2 is affixed to the circuit main body 211 and electrically connected thereto, and disposed between the circuit main body 211 and the first frame surface 131. The circuit component 21 further includes a plurality of electronic members 218 disposed on the circuit main body 211. For example, the electronic members 218 can include a chip, a resistance, and/or a capacitance, but it is not limited thereto.

An end of each of the movable suspension arms 212 is connected to the circuit main body 211, and the other end of each of the movable suspension arms 212 is connected to the bottom plate 11 via the electrical connector E1. The movable suspension arms 212 are radially disposed on the circuit main body 211 centered on the optical axis AX1. As seen from the first direction D1, the movable suspension arms 212 surround the circuit main body 211. When the first movable assembly 20 shifts, the movable suspension arms 212 can move relative to the circuit main body 211 and the fixed assembly 10.

In this embodiment, the circuit component 21 has two movable suspension arms 212, but it is not limited thereto. In some embodiments, the circuit component 21 has one movable suspension arm 212. In some embodiments, the circuit component 21 has three, four, or more movable suspension arms 212. Each of the movable suspension arms 212 includes a connecting portion 213, a first section 214, a second section 215, and a mounting portion 216. The image sensor L2 is electrically connected to the bottom plate 11 via the circuit main body 211, the connecting portion 213, the first section 214, the second section 215, the mounting portion 216, and the electrical connector E1 in sequence.

The connecting portion 213 is connected to the circuit main body 211 and the first section 214. In this embodiment, the connecting portion 213 can be a bending structure. Moreover, the connecting portion 213 can be L-shape. The connecting portion 213 has a first region 2131 and a second region 2132. The first region 2131 is connected to the circuit main body 211 and the second region 2132. The first region 2131 can be a plate structure. When the first movable assembly 20 is in the initial position, the first region 2131 substantially extends in the first direction D1, and the second region 2132 substantially extend in a second direction D2. The second direction D2 is perpendicular to the first direction D1.

The first section 214 extends in a different direction than the optical axis AX1, and is electrically connected to the image sensor L2. In this embodiment, when the first movable assembly 20 is in the initial position, the first section 214 extends in a third direction D3. The third direction D3 is perpendicular to the first direction D1 and the second direction D2. Since the connecting portion 213 does not extend in the third direction D3, the extending direction of the first section 214 is different than that of the connecting portion 213.

In this embodiment, the circuit component 21 has two first sections 214, but it is not limited thereto. Two first sections 214 are disposed on two sides or the opposite sides of the first movable assembly 20. In this embodiment, the holder 22 is disposed between two first sections 214, and two first sections 214 are parallel. Furthermore, the first sections 214 can be disposed on the peripheral area of the first movable assembly 20 (holder 22).

Figure 6:
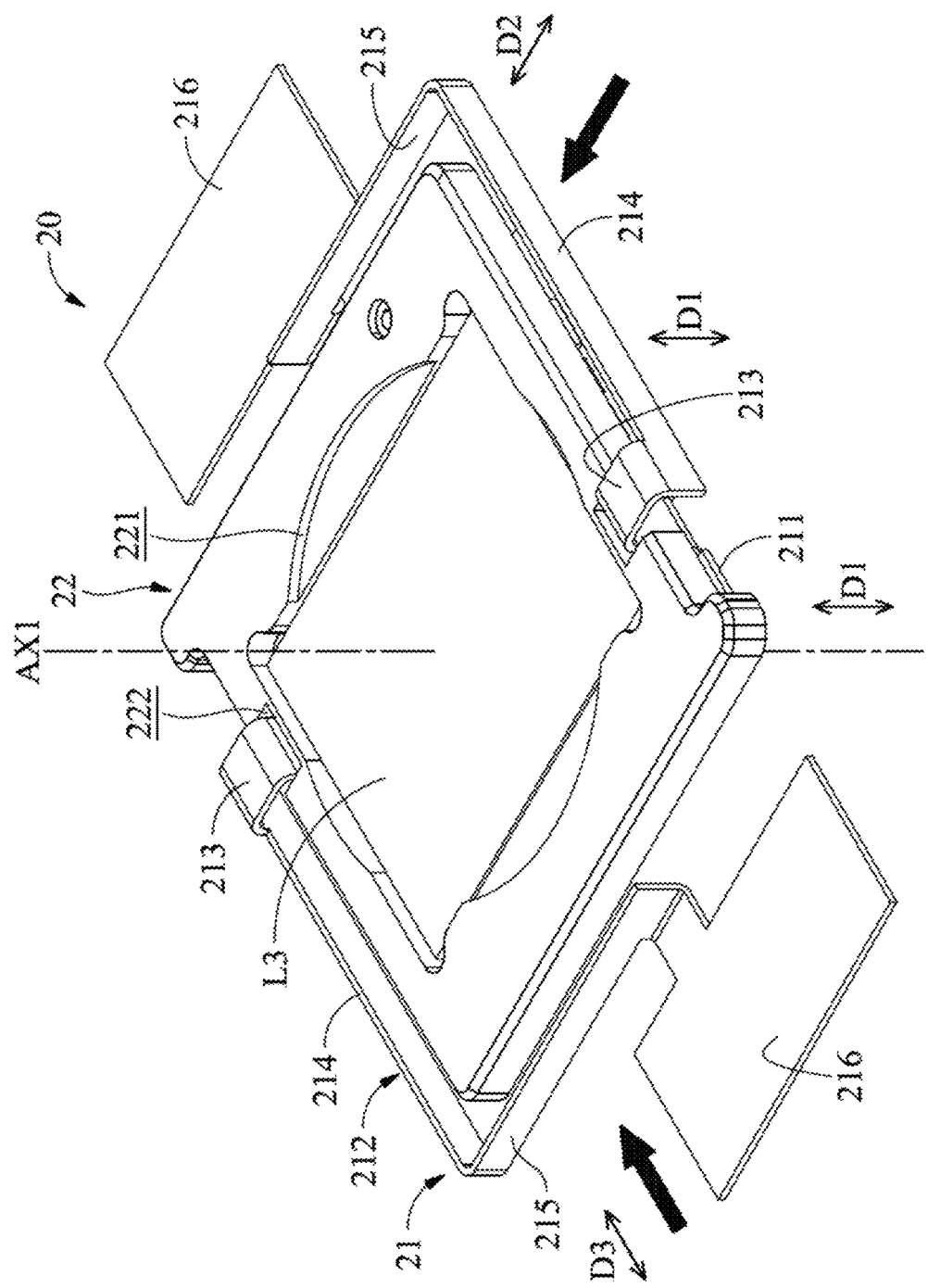
FIG. 6 is a perspective view of the first movable assembly in accordance with some embodiments of the present disclosure.

FIG. 6 is a perspective view of the first movable assembly 20 in accordance with some embodiments of the present disclosure. As shown in FIG. 6, as seen from a direction that is perpendicular to the optical axis AX1 (second direction D2), the first section 214 and the first movable assembly 20 are partially overlapped. In this embodiment, as seen from a direction that is perpendicular to the optical axis AX1 (second direction D2), the first section 214 and the holder 22 are overlapped.

In this embodiment, the width W1 of the first section 214 is greater than the thickness W2 of the first section 214. The width W1 is measured along a direction parallel to the optical axis AX1 (first direction D1), and the thickness W2 is measured along a direction that is perpendicular to the optical axis AX1 (second direction D2). In other words, the dimensions of the first section 214 on a direction parallel to the optical axis AX1 (first direction D1) is greater than the dimensions of the first section 214 on a direction that is perpendicular to the optical axis AX1.

The second section 215 is connected to the first section 214 and the mounting portion 216. The second section 215 and the first section 214 are extended toward different directions. In this embodiment, the second section 215 extends in the second direction D2, and perpendicular to the first section 214.

In this embodiment, the circuit component 21 has two second sections 215, but it is not limited thereto. Two second sections 215 are disposed on two sides or the opposite sides of the first movable assembly 20. In this embodiment, the holder 22 is disposed between two second sections 215, and two second sections 215 are parallel. Furthermore, the second sections 215 can be disposed on the peripheral area of the first movable assembly 20 (holder 22).

As shown in FIG. 6, as seen from a direction that is perpendicular to the optical axis AX1 (second direction D3), the second section 215 and the first movable assembly 20 are partially overlapped. In this embodiment, as seen from a direction that is perpendicular to the optical axis AX1 (second direction D3), the second section 215 and the holder 22 are overlapped.

Owing to the first section 214 and the second section 215, the plasticity and the durability of the circuit component 21 can be increased. Moreover, since two movable suspension arms 212 are symmetrical, the first movable assembly 20 can maintain balance during the first driving assembly 30 drives the first movable assembly 20 to move.

The mounting portion 216 is connected to the second section 215 and the electrical connector E1. As shown in FIG. 4, the mounting portion 216 extends in a direction that is perpendicular to the first direction D1. The mounting portion 216 is disposed on the opposite sides of the case 12. In this embodiment, the mounting portion 216 can pass the case 12 and be disposed outside the case 12. The case has a lateral wall 121 parallel to the optical axis AX1. As seen from a direction parallel to the optical axis AX1 (first direction D1), the lateral wall 121 and the circuit component 21 (mounting portion 216) are partially overlapped.

In this embodiment, the circuit component 21 can well transmit the image signal generated by the image sensor L2 to the bottom plate 11. A portion of the circuit component 21 is elastic due to its design. Therefore, the interference of the circuit component 21 during the first driving assembly 30 drives the image sensor L2 to move relative to the fixed assembly 10 can be reduced due to the design of the movable suspension arms 212. The accuracy of the movement or the rotation of the image sensor L2 driven by the first driving assembly 30 can be enhanced.

In this embodiment, the circuit main body 211, the connecting portion 213, the first section 214, the second section 215, and the mounting portion 216 can be integrally formed as one piece. The circuit component 21 has a circuit component surface 217 continuously arranged on the circuit main body 211, the connecting portion 213, the first section 214, the second section 215, and the mounting portion 216. The circuit component surface 217 on the circuit main body 211 faces the image sensor L2, or can be connected to the image sensor L2. The circuit component surface 217 on the first section 214 is parallel to the optical axis AX1. The circuit component surface 217 on the second section 215 is parallel to the optical axis AX1. The circuit component surface 217 on the mounting portion 216 is perpendicular to the optical axis AX1. In this embodiment, owing to the design of the integrally formed circuit component 21, its mechanical strength and the convenience for manufacturing can be enhanced.

The holder 22 is disposed on the circuit main body 211 of the circuit component 21 and the image sensor L2, and situated outside the case 12. In this embodiment, the holder 22 is affixed to the circuit main body 211 and surrounds the image sensor L2. The holder 22 can be an annular structure surrounding the optical axis AX1. The holder 22 can extend on a plane that is perpendicular to the optical axis AX1. The holder 22 can be made of a rigid insulation material, such as hard plastic.

In this embodiment, the holder 22 is configured to hold a light transmissive plate L3. In some embodiments, the light transmissive plate L3 can be a transparent protecting plate, and can be made by glass or acrylic. In some embodiments, the light transmissive plate L3 can be an optical filter, which can used to filter a component in the light. For example, the light transmissive plate L3 can filter the invisible component in light (such as the infrared radiation or the ultraviolet), but it is not limited thereto. In some embodiments, the light transmissive plate L3 is not disposed on the holder 22.

The holder 22 has a second through hole 221 (through hole) and a receiving portion 222. The second through hole 221 can pass through the holder 22 along the first direction D1. When the first movable assembly 20 is in the initial position, the optical axis AX1 passes the center of the second through hole 221. Furthermore, the light transmissive plate L3 and the image sensor L2 can be disposed in the second through hole 221, and the light transmissive plate L3 can be separated from the image sensor L2.

The receiving portion 222 is formed on the lateral wall of the holder 22. In this embodiment, the receiving portion 222 is separated from the second through hole 221. The receiving portion 222 is configured to receive a portion of the circuit component 21. In this embodiment, a portion of the connecting portion 213 is accommodated in the receiving portion 222. Owing to the holder 22 and the receiving portion 222, the miniaturization design of the image sensor driving mechanism 1 can be achieved, and the circuit component 21 can be protected.

The first driving assembly 30 is disposed between the circuit component 21 of the first movable assembly 20 and the bottom plate 11, and situated outside the case 12. As shown in FIG. 4, the first driving assembly 30 can be disposed on the peripheral area of the first movable assembly 20.

Figure 7:
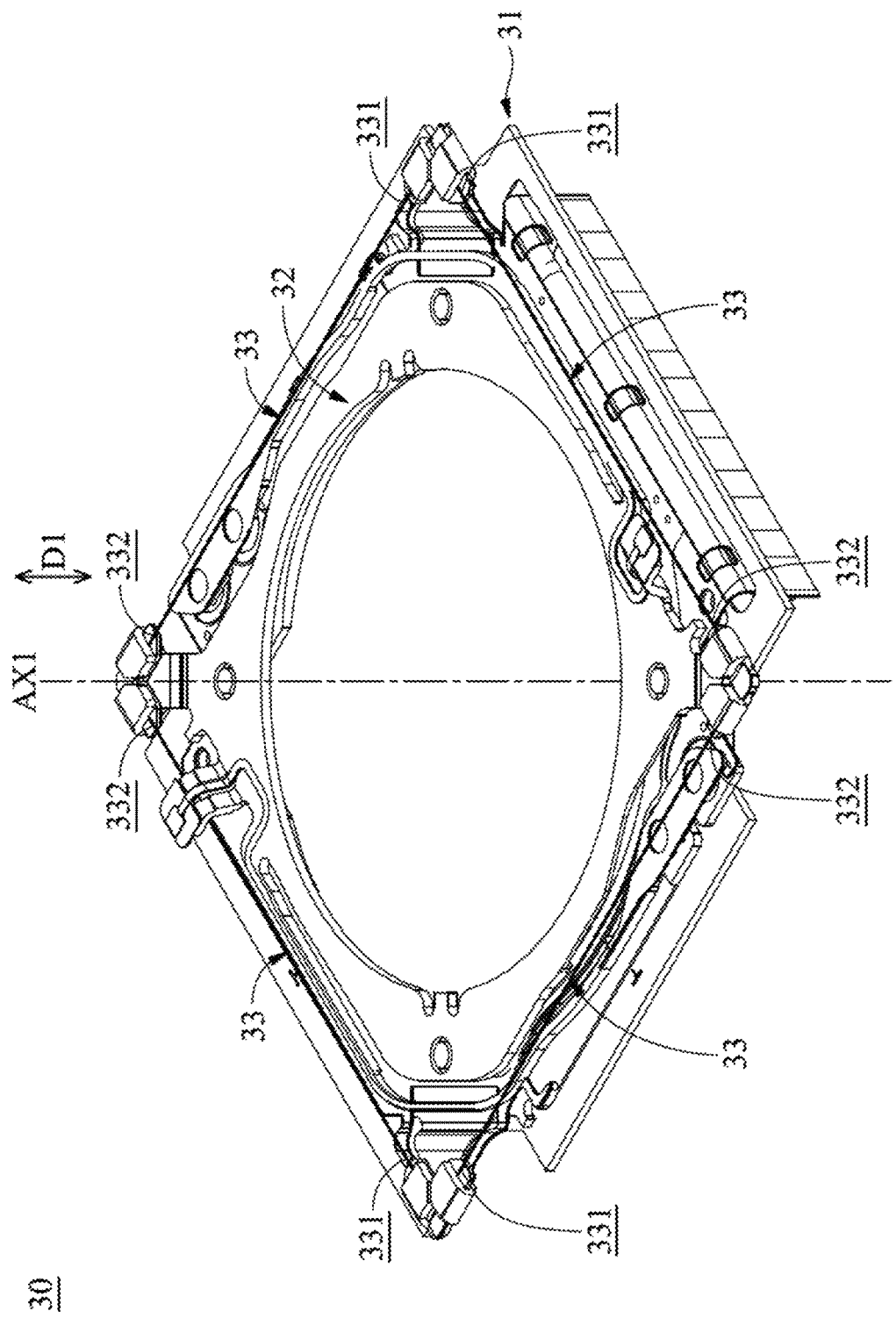
FIG. 7 is a perspective view of the first driving assembly in accordance with some embodiments of the present disclosure.
Figure 8:
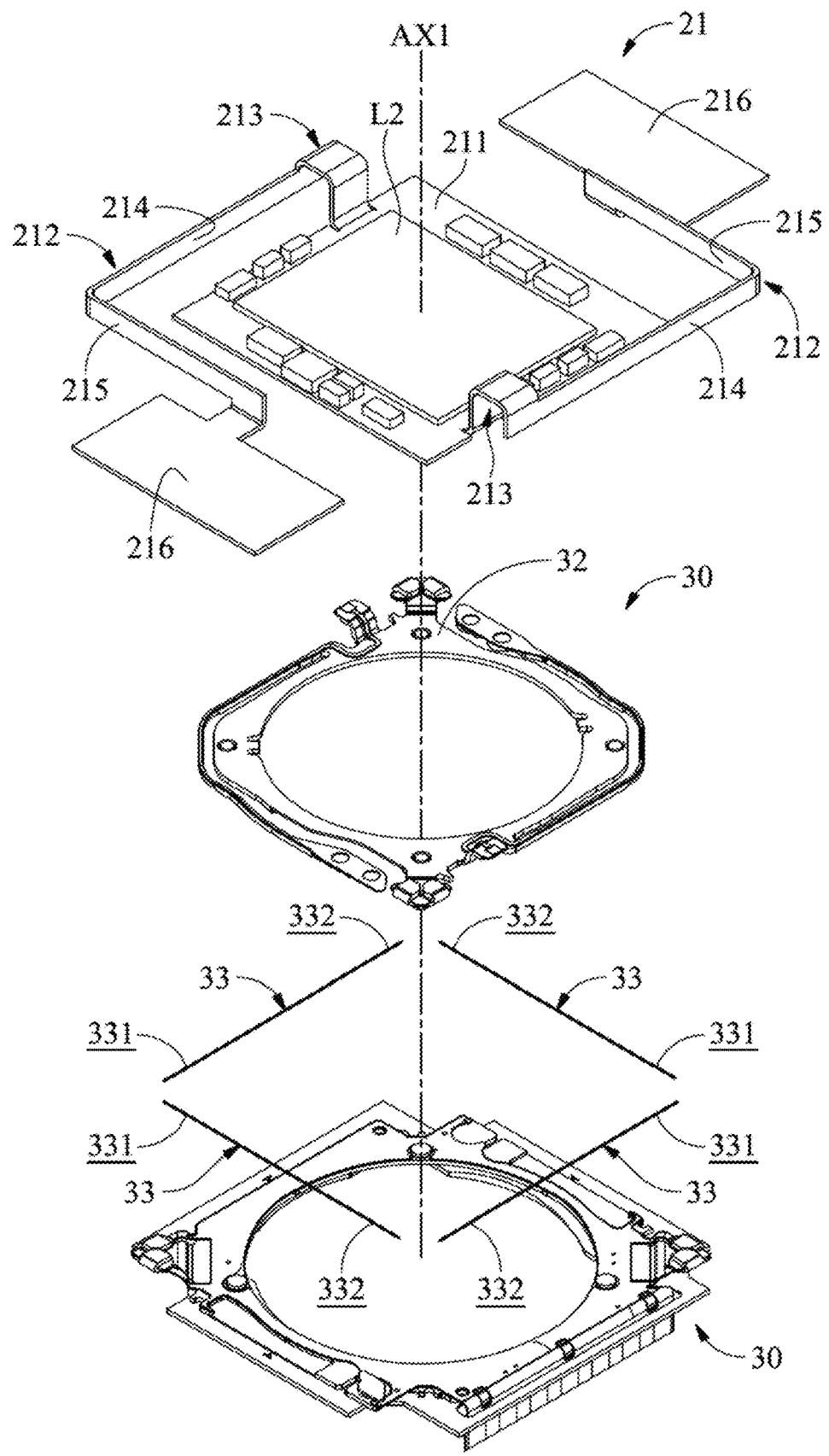
FIG. 8 is an exploded view of the circuit component and the first driving assembly in accordance with some embodiments of the present disclosure.

FIG. 7 is a perspective view of the first driving assembly 30 in accordance with some embodiments of the present disclosure. FIG. 8 is an exploded view of the circuit component 21 and the first driving assembly 30 in accordance with some embodiments of the present disclosure. The first driving assembly 30 includes a first driving base 31, a second driving base 32, and a plurality of biasing wires 33. The first driving base 31 is affixed to the bottom plate 11 of the fixed assembly 10 (as shown in FIG. 3B). In this embodiment, the first driving base 31 can be an annular structure surrounding the optical axis AX1. The first driving base 31 can extend on a plane that is perpendicular to the optical axis AX1.

The second driving base 32 is shiftably and rotatably disposed on the first driving base 31. In other words, the second driving base 32 can shift and/or rotate relative to the first driving base 31. In this embodiment, the second driving base 32 can be an annular structure surrounding the optical axis AX1. The second driving base 32 can extend on a plane that is perpendicular to the optical axis AX1. Furthermore, the circuit main body 211 of the circuit component 21 can be disposed on the second driving base 32. In this embodiment, the circuit main body 211 can be affixed to the second driving base 32.

A first end 331 of each of the biasing wires 33 is connected to the first driving base 31, and a second end 332 of each of the biasing wires 33 is connected to the second driving base 32. The connecting relationship between the biasing wires 33 and the first and second driving bases 31 and 32 can include various different designs, and is not limited to the disclosure in the embodiment.

In this embodiment, the biasing wires 33 can be made by shape memory alloys (SMA). For example, the biasing wires 33 can include a titanium-nickel (TiNi) alloy, a titanium-palladium (TiPd) alloy, a titanium-nickel (TiNiCu) alloy, a titanium-nickel-palladium (TiNiPd) alloy, or a combination thereof, but it is not limited thereto. Therefore, when a power is applied to the biasing wire 33, the length of the biasing wire 33 changes. For example, the temperature of the biasing wire 33 becomes higher when the voltage is higher, and the length of the biasing wire 33 shortens when the temperature of the biasing wire 33 becomes higher.

Since the first end 331 and the second end 332 of the biasing wire 33 are respectively connected to the first driving base 31 and the second driving base 32, the biasing wire 33 can provide a pulling force to move (shift or rotate) the second driving base 32 relative to the first driving base 31 when the biasing wire 33 shortens. Therefore, the magnitude of the pulling force can be adjusted by adjusting the voltage applied on the biasing wire 33, so as to rotate the second driving base 32 to a predetermined position.

Since the image sensor L2 is disposed on the circuit main body 211 of the circuit component 21, and the circuit main body 211 is disposed on the second driving base 32, the second driving base 32 can drive the image sensor L2 to move together. Owing to the first driving assembly 30 and the first movable assembly 20, the image sensor driving mechanism 1 (camera module A10) can include image stabilization and compensation functions.

The second movable assembly 40 is disposed on the frame 13 and situated inside the case 12. The second movable assembly includes a carrier 41, a lower elastic member 42, and an upper elastic member 43. The carrier 41 is disposed on the frame 13, and can move along the optical axis AX1 relative to the case 12 and the frame 13. The carrier 41 is configured to hold the optical member L1. In this embodiment, the carrier 41 can be made of a rigid insulation material, such as hard plastic. The carrier 41 can be an annular structure surrounding the optical axis AX1. The carrier 41 can extend on a plane that is perpendicular to the optical axis AX1.

The carrier 41 has a third through hole 411 (through hole). The third through hole 411 passes through the carrier 41 along the first direction D1, and the optical axis AX1 passes the center of the third through hole 411. The third through hole 411 corresponds to the first through hole 133 and the second through hole 221. The third through hole 411, the first through hole 133, and the second through hole 221 are arranged along the optical axis AX1 in sequence. Furthermore, the optical member L1 can be disposed in the third through hole 411, so that the optical member L1, the light transmissive plate L3, and the image sensor L2 can be arranged along the optical axis AX1 in sequence.

The lower elastic member 42 is elastically connected to the frame 13 and the carrier 41. The upper elastic member 43 is elastically connected to the case 12 and the carrier 41. The carrier 41 is disposed between the lower elastic member 42 and the upper elastic member 43. The lower elastic member 42 and the upper elastic member 43 can be flat springs, and are configured to provide an elastic force between the fixed assembly 10 and the carrier 41. After the second driving assembly 50 drives the carrier 41 to shift relative to the fixed assembly 10 along the optical axis AX1, the upper elastic member 43 and the lower elastic member 42 can resume the carrier 41 to its initial position.

The second driving assembly 50 is disposed in the case 12, and situated between the case 12 and the carrier 41. The second driving assembly 50 is configured to drive the carrier 41 to shift relative to the case 12 and the frame 13 along the first direction D1. The second driving assembly 50 includes one or more driving coils 51 and a plurality of driving magnetic members 52. The driving coils 51 are disposed on the carrier 41 and corresponded to the driving magnetic members 52. In this embodiment, the driving coils 51 surround the outer wall of the carrier 41. The driving magnetic members 52 are affixed to the inner side of the case 12, and separated from the driving coils 51 and the carrier 41.

In this embodiment, the image sensor driving mechanism 1 includes four driving magnetic members 52, but it is not limited thereto. The driving magnetic members 52 can be permanent magnets. The driving coils 51 can create a magnetic field by providing a current to the driving coils 51, and a magnetic force can be generated between the driving coils 51 and the driving magnetic members 52. The aforementioned magnetic force can drive the carrier 41 to shift relative to the case 12 and the frame 13 along the optical axis AX1.

As shown in FIG. 4, the second driving assembly 50 further includes a plurality of horizontal driving coils 53. The horizontal driving coils 53 can be affixed to the frame 13, and situated between the driving magnetic members 52 and the frame 13. The horizontal driving coils 53 can create a magnetic field by providing a current to the horizontal driving coils 53, and a magnetic force can be generated between the horizontal driving coils 53 and the driving magnetic members 52. The aforementioned magnetic force can drive the carrier 41 to shift relative to the case 12 and the frame 13 along a direction that is perpendicular to the optical axis AX1 (such as the second direction D2 or the third direction D3).

In this embodiment, owing to the second driving assembly 50, the optical image stabilization of the image sensor driving mechanism 1 (camera module A30) can become better. Therefore, when the optical member L1 deviates due to shaking or swaying, it can provide a well optical shaking compensation, so as to obtain a high quality image.

As shown in FIGS. 3A, 3B, and 4, the image sensor driving mechanism further includes a position detecting assembly 60 configured to sensing the movement of the first movable assembly 20 relative to the fixed assembly 10. In this embodiment, the position detecting assembly 60 has a magnetic force sensor 61 disposed on the first movable assembly.

In this embodiment, the magnetic force sensor 61 can be disposed on the circuit main body 211 of the first movable assembly 20 and electrically connected thereto. The magnetic force sensor 61 corresponds to the driving magnetic member 52 of the second driving assembly 50.

Since the driving magnetic member 52 is affixed to the fixed assembly 10, the magnetic force sensor 61 can generate a distance signal corresponding to the change of the detected magnetic force from the driving magnetic member 52 when the distance between the first movable assembly 20 and the fixed assembly 10 changes. Therefore, the image sensor driving mechanism 1 can precisely detect the movement of the first movable assembly 20 according to the distance signal. Furthermore, since the position detecting assembly 60 uses the driving magnetic member 52 of the second driving assembly 50 to generate the distance signal, the component of the position detecting assembly 60 can be reduced, so as to achieve the purpose of miniaturization.

In summary, in the image sensor driving mechanism of the present disclosure, owing to the circuit component, the first driving assembly can precisely move the image sensor, so as to provide a well optical shaking compensation, and the image sensor can obtain a high quality image.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

What is claimed is:

1. An image sensor driving mechanism, comprising:
a fixed module;
a first movable module, wherein the first movable module is movable relative to the fixed module and configured to connect an image sensor having an optical axis;
a circuit module, electrically connected to the image sensor, wherein the first movable module is movably connected to the fixed module via the circuit module;
a position detecting module, comprising a sensor and a sensing object, and configured to detect movement of the first movable module relative to the fixed module, wherein the sensor is electrically connected to the circuit module; and
a first driving module, configured to drive the first movable module to move relative to the fixed module,
wherein the circuit module comprises a movable suspension arm comprising a connecting portion, a first section, and a second section, the movable suspension arm is flexible, the connecting portion is connected between the first movable module and the first section, the connecting portion has a bending structure, the first section is connected between the connecting portion and the second section, an extending direction of the connecting portion is different with an extending direction of the first section, the extending direction of the first section and an extending direction of the second section are perpendicular to the optical axis, the first section has a plate structure, and a direction of a thickness of the first section is perpendicular to the optical axis,
wherein the image sensor comprises a first side surface and a second side surface connected to the first side surface, the first side surface faces an inner surface of the first section, the second side surface faces an inner surface of the second section, and the inner surface of the first section and the inner surface of the second section are perpendicular to each other.

2. The image sensor driving mechanism as claimed in claim 1, wherein the extending direction of the first section is different from the extending direction of the second section.

3. The image sensor driving mechanism as claimed in claim 2, wherein the extending direction of the first section is perpendicular to the extending direction of the second section.

4. The image sensor driving mechanism as claimed in claim 1, wherein as seen from the optical axis, the second section is disposed outside the first driving module.

5. The image sensor driving mechanism as claimed in claim 1, wherein the image sensor driving mechanism further comprises a holder disposed around the image sensor.

6. The image sensor driving mechanism as claimed in claim 5, wherein the holder has a lateral surface and a receiving portion, the lateral surface is disposed between the image sensor and the first section, and the receiving portion is recessed from the lateral surface, wherein the connecting portion is accommodated in the receiving portion.

7. The image sensor driving mechanism as claimed in claim 6, wherein the connecting portion has an L-shaped structure.

8. The image sensor driving mechanism as claimed in claim 5, wherein the image sensor driving mechanism further comprises a light transmissive plate disposed on the holder.

9. The image sensor driving mechanism as claimed in claim 1, wherein a width of the first section is greater than a thickness of the first section, the width is measured along a direction parallel to the optical axis, and the thickness is measured along a direction that is perpendicular to the optical axis.

10. The image sensor driving mechanism as claimed in claim 1, wherein the circuit module further comprises an additional movable suspension arm, and the movable suspension arm and the additional movable suspension arm are rotational symmetrical relative to the optical axis.

11. The image sensor driving mechanism as claimed in claim 1, wherein the circuit module further comprises a mounting portion fixedly connected to the fixed module, and the movable suspension arm connects the first movable module to the mounting portion.

12. The image sensor driving mechanism as claimed in claim 1, wherein as seen from a direction that is perpendicular to the optical axis, the position detecting module overlaps the image sensor.

13. The image sensor driving mechanism as claimed in claim 1, wherein the first driving module comprises a biasing member connected to the first movable module and the fixed module.

14. The image sensor driving mechanism as claimed in claim 1, wherein the circuit module comprises a mounting portion fixedly connected to the fixed module, and the mounting portion has a plate structure extending along a direction that is perpendicular to the optical axis.

15. The image sensor driving mechanism as claimed in claim 1, wherein the fixed portion comprises a frame, the frame has a frame surface facing the first movable module and perpendicular to the optical axis, and a gap is formed between the frame surface and the first movable module.

16. The image sensor driving mechanism as claimed in claim 15, wherein the image sensor driving mechanism further comprises:
a second movable module, movably disposed in the fixed module and comprising a carrier, wherein the carrier is configured to hold an optical member; and
a second driving module, configured to drive the second movable module to move relative to the fixed module along the optical axis;
wherein the frame surface is disposed between the second movable module and the first movable module.

17. An image sensor driving mechanism, comprising:
a fixed module;
a first movable module, wherein the first movable module is movable relative to the fixed module and configured to connect an image sensor having an optical axis;
a circuit module, electrically connected to the image sensor, wherein the first movable module is movably connected to the fixed module via the circuit module;
a position detecting module, comprising a sensor and a sensing object, and configured to detect movement of the first movable module relative to the fixed module, wherein the sensor is electrically connected to the circuit module; and
a first driving module, configured to drive the first movable module to move relative to the fixed module,
wherein the circuit module comprises a movable suspension arm comprising a connecting portion, a first section and a second section, the movable suspension arm is flexible, the connecting portion is connected between the first movable module and the first section, the connecting portion has a bending structure, the first section is connected between the connecting portion and the second section, an extending direction of the connecting portion is different with an extending direction of the first section, the extending direction of the first section and an extending direction of the second section are perpendicular to the optical axis, the first section has a plate structure, and a direction of a thickness of the first section is perpendicular to the optical axis,
wherein the first movable module comprises a circuit main body having a plate structure, the connecting portion has a first region that is in contact with the circuit main body, and a 90 degrees angle is formed between the first region and the circuit main body, a first direction is parallel to the optical axis, a second direction is perpendicular to an inner surface of the first section, a third direction is perpendicular to an inner surface of the second section, the second direction is perpendicular to the third direction, the inner surface of the first section and the inner surface of the second section are perpendicular to each other, and the second direction and the third direction are perpendicular to the first direction and the optical axis.

18. An image sensor driving mechanism, comprising:
a fixed module;
a first movable module, wherein the first movable module is movable relative to the fixed module and configured to connect an image sensor having an optical axis;
a circuit module, electrically connected to the image sensor, wherein the first movable module is movably connected to the fixed module via the circuit module;
a position detecting module, comprising a sensor and a sensing object, and configured to detect movement of the first movable module relative to the fixed module, wherein the sensor is electrically connected to the circuit module; and a first driving module, configured to drive the first movable module to move relative to the fixed module, wherein the circuit module comprises a movable suspension arm comprising a connecting portion, a first section and a second section, the movable suspension arm is flexible, the connecting portion is connected between the first movable module and the first section, the connecting portion has a bending structure, the first section is connected between the connecting portion and the second section, an extending direction of the connecting portion is different with an extending direction of the first section, the extending direction of the first section and an extending direction of the second section are perpendicular to the optical axis, the first section has a plate structure, the second section has a plate structure, the second section has a plate structure, a first direction is parallel to the optical axis, a second direction is perpendicular to an inner surface of the first section, a third direction is perpendicular to an inner surface of the second section, the second direction is perpendicular to the third direction, the inner surface of the first section and the inner surface of the second section are perpendicular to each other, and the second direction and the third direction are perpendicular to the first direction and the optical axis.

19. An image sensor driving mechanism, comprising:

a fixed module;

a first movable module, wherein the first movable module is movable relative to the fixed module and configured to connect an image sensor having an optical axis;

a circuit module, electrically connected to the image sensor, wherein the first movable module is movably connected to the fixed module via the circuit module;

a position detecting module, comprising a sensor and a sensing object, and configured to detect movement of the first movable module relative to the fixed module, wherein the sensor is electrically connected to the circuit module; and a first driving module, configured to drive the first movable module to move relative to the fixed module, wherein the circuit module comprises a movable suspension arm comprising a connecting portion, a first section and a second section, the movable suspension arm is flexible, the connecting portion is connected between the first movable module and the first section, the connecting portion has a bending structure, the first section is connected between the connecting portion and the second section, an extending direction of the connecting portion is different with an extending direction of the first section, the extending direction of the first section and an extending direction of the second section are perpendicular to the optical axis, the first section has a plate structure, and a direction of a thickness of the first section is perpendicular to the optical axis, wherein the circuit module further comprises a mounting portion fixedly connected to the fixed module, the movable suspension arm connects the first movable module to the mounting portion, and the mounting portion does not overlap with the first movable module as viewed along the optical axis, a first direction is parallel to the optical axis, a second direction is perpendicular to an inner surface of the first section, a third direction is perpendicular to an inner surface of the second section, the second direction is perpendicular to the third direction, the inner surface of the first section and the inner surface of the second section are perpendicular to each other, and the second direction and the third direction are perpendicular to the first direction and the optical axis.

* * * * *